(12) United States Patent
Wiemker et al.

(10) Patent No.: US 12,347,053 B2
(45) Date of Patent: Jul. 1, 2025

(54) 3-D VIRTUAL ENDOSCOPY RENDERING

(71) Applicant: KONINKLIJKE PHILIPS N.V., Eindhoven (NL)

(72) Inventors: Rafael Wiemker, Kisdorf (DE); Mukta Joshi, Best (NL); Jorg Sabczynski, Norderstedt (DE); Tobias Klinder, Uelzen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 903 days.

(21) Appl. No.: 17/298,038

(22) PCT Filed: Nov. 22, 2019

(86) PCT No.: PCT/EP2019/082260
§ 371 (c)(1),
(2) Date: May 28, 2021

(87) PCT Pub. No.: WO2020/114806
PCT Pub. Date: Jun. 11, 2020

(65) Prior Publication Data
US 2022/0101617 A1   Mar. 31, 2022

Related U.S. Application Data

(60) Provisional application No. 62/776,053, filed on Dec. 6, 2018.

(51) Int. Cl.
*G06T 7/00*    (2017.01)
*G06T 19/20*   (2011.01)
(52) U.S. Cl.
CPC .......... *G06T 19/20* (2013.01); *G06T 2210/41* (2013.01); *G06T 2219/2012* (2013.01)

(58) Field of Classification Search
CPC ............ G01N 23/04; G01N 2223/635; G01N 23/087; G01N 2223/206; G01N 23/203;
(Continued)

(56) References Cited

U.S. PATENT DOCUMENTS 6,514,082 B2   2/2003   Kaufman
7,599,465 B2   10/2009  Walter
(Continued)

FOREIGN PATENT DOCUMENTS

JP   2007014483 A       1/2007
JP   2019114035 A   *   7/2019
KR   101705346 B1   *   2/2017

OTHER PUBLICATIONS

PCT International Search Report, International application No. PCT/EP2019/082260, Feb. 24, 2020.
(Continued)

*Primary Examiner* — Quan M Hua
(74) *Attorney, Agent, or Firm* — Larry Liberchuk

(57) ABSTRACT

A three-dimensional virtual endoscopy rendering of a lumen of a tubular structure is based on both non-spectral and spectral volumetric imaging data. The three-dimensional virtual endoscopy rendering includes a 2-D image of a lumen of the tubular structure from a viewpoint of a virtual camera of a virtual endoscope passing through the lumen. In one instance, the three-dimensional virtual endoscopy rendering is similar to the view which is provided by a physical endoscopic video camera inserted into the actual tubular structure and positioned at that location. The non-spectral volumetric image data is used to determine an opacity and shading of the three-dimensional virtual endoscopy rendering. The spectral volumetric image data is used to visually encode the three-dimensional virtual endoscopy rendering to
(Continued)

visually distinguish an inner wall of the tubular structure and structure of interest on the wall.

20 Claims, 3 Drawing Sheets

(58) Field of Classification Search
CPC ........... G01N 2223/423; G01N 23/005; G01N 23/083; G01N 23/046; G01N 23/18; G01N 2223/401; G01N 23/06; G01V 5/0041; G01V 5/0025; G01V 5/0033; G01V 5/0016; G01V 5/005; G01V 5/0066; G06T 11/003; G06T 2211/416; G06T 2207/10116; G06T 2207/30112; G06T 7/0004; G06T 7/12; G06T 7/68
See application file for complete search history.

(56) References Cited

U.S. PATENT DOCUMENTS

| | | | |
|---|---|---|---|
| 7,668,289 B2 | 2/2010 | Proksa | |
| 7,839,402 B2 | 11/2010 | Dekel | |
| 7,968,853 B2 | 6/2011 | Altman | |
| 8,442,184 B2 | 5/2013 | Forthmann | |
| 8,953,911 B1* | 2/2015 | Xu | G02B 6/26 385/12 |
| 9,865,079 B2 | 1/2018 | Miyamoto | |
| 2007/0189443 A1* | 8/2007 | Walter | G06T 7/136 378/4 |
| 2009/0244060 A1 | 10/2009 | Suhling | |
| 2010/0215226 A1 | 8/2010 | Kaufman | |
| 2013/0296682 A1* | 11/2013 | Clavin | G16H 30/40 600/407 |
| 2016/0055650 A1* | 2/2016 | Park | A61B 8/5246 382/131 |
| 2016/0275709 A1 | 9/2016 | Gotman | |
| 2018/0247153 A1* | 8/2018 | Ganapati | G06F 18/285 |
| 2020/0034968 A1* | 1/2020 | Freiman | G06T 17/005 |
| 2020/0037997 A1* | 2/2020 | Viggen | A61B 8/5223 |

OTHER PUBLICATIONS

Rie T. et al., "Deep Multi-Spectral Ensemble Learning for Electronic Cleansing in Dual-Energy CT Colonography", Proc of SPIE, vol. 10134, 2017.
Nappi J. et al., "Automated Detection of Colorectal Lesions with Dual-Energy CT Colonography", Proceedings of SPIE, vol. 8315, Feb. 22, 2012 (Feb. 22, 2012), p. 83150V, XP055660921.
Radin Adi et al., "Analysis of Multi-Energy Spectral CT for Advanced Clinical, Pre-Clinical, and Industrial Applications", Nov. 7, 2014 (Nov. 7, 2014), XP055462103.
Faisal M. et al., "Deep Learning with Cinematic Rendering: Fine-Tuning Deep Neural Networks Using Photorealistic Medical Images", arxiv.org, Cornell University Library, 201 Olin Library Cornell University Ithaca, NY 14853, May 22, 2018 (May 22, 2018), XP081410062.
Long J. et al., "Fully Convolutional Networks for Semantic Segmentation," Proceedings of the IEEE Conference on Computer Vision and Pattern Recognition, 2015.
Ronneberger O. et al., "U-Net: Convolution Networks for Biomedical Image Segmentation," Medical Image Computing and Computer-Assisted Intervention (MICCAI), Springer, LNCS, vol. 9351: 234-241, 2015.
Gouk et al., "Fast Sliding Window Classification with Convolutional Neural Networks," Proceedings of the 29th International Conference on Image and Vision Computing New Zealand, pp. 114-118, Nov. 19-21, 2014.

* cited by examiner

3-D VIRTUAL ENDOSCOPY RENDERING

FIELD OF THE INVENTION

The following generally relates to imaging and more particularly to a 3-D virtual endoscopy rendering and is described with particular application to computed tomography.

BACKGROUND OF THE INVENTION

Polyps in the colon can possibly develop into colon cancer. The literature indicates that if such polyps are removed early then cancer can be prevented highly effectively. A colonoscopy is a procedure available to asymptomatic subjects who are over a certain age to detect and assess possible polyps. For a colonoscopy, a gas is insufflated into the colon to inflate the colon so that the wall of the colon can be more easily inspected. An endoscope, which includes a video camera on a flexible tube, is inserted into the colon through the anus and passed through the lumen of the colon. The video camera records images of the interior walls of the colon as it is passed through the lumen. The images can be used for visual inspection of the wall. During the procedure, suspected polyps can be biopsied and/or removed. Endoscopic colonoscopy is an invasive procedure.

Computed tomography (CT) virtual colonoscopy (VC) is a non-invasive, imaging procedure. With CT VC, volumetric image data of the colon is acquired and processed to generate a three-dimensional virtual endoscopic (3-D VE) rendering of a lumen of a colon through a 2-D image of the lumen of the colon from a viewpoint of a virtual camera of a virtual endoscope passing through the lumen with shading derived from the viewing direction and local shapes of iso-surfaces to provide depth information. Generally, the 2-D image provides a 3-D impression similar to a view of a real endoscope. However, there are classes of polyps (e.g., flat and/or serrated polyps) that tend to be difficult to visually detect in the 3-D VE by shape due to their inconspicuousness with the colon wall. As such, there is an unresolved need for an improved 3-D VE.

SUMMARY OF THE INVENTION

Aspects described herein address the above-referenced problems and others.

A 3-D VE rendering of a lumen of a tubular structure is based on both non-spectral volumetric imaging data and spectral volumetric imaging data. The non-spectral volumetric image data is used to determine an opacity and shading of the 3-D VE rendering. The spectral volumetric image data is used to visually encode the 3-D VE rendering to visually differentiate the inner wall of the tubular structure from structure of interest on the wall.

In one aspect, a system includes a processor and a memory storage device configured with a three-dimensional virtual endoscopy module and a rendering module. The processor is configured to process non-spectral volumetric image data from a scan of a tubular structure with the three-dimensional virtual endoscopy module to generate a three-dimensional endoscopic rendering of a lumen of the tubular structure with an opacity and shading that provide a three-dimensional impression. The processor is further configured to process spectral volumetric image data from the same scan with the three-dimensional virtual endoscopy module to produce a visual encoding on the three-dimensional endoscopic rendering that visually distinguishes a wall of the tubular structure from structure of interest on the wall based on spectral characteristics. The processor is further configured to execute the rendering module to display the three-dimensional endoscopic rendering with the visual encoding via a display monitor.

In another aspect, a method includes generating a three-dimensional endoscopic rendering of a lumen of a tubular structure with an opacity and shading that provide a three-dimensional impression based on non-spectral volumetric image data from a scan of the tubular structure. The method further includes generating a visual encoding for the three-dimensional endoscopic rendering that visually distinguishes a wall of the tubular structure from structure of interest on the wall based on spectral characteristics determined from spectral volumetric image data from the scan. The method further includes displaying three-dimensional endoscopic rendering with the visual encoding.

In another aspect, a computer-readable storage medium stores instructions that when executed by a computer cause the computer to perform a method for using a computer system to generate a three-dimensional endoscopic rendering. The method includes generating a three-dimensional endoscopic rendering of a lumen of a tubular structure with an opacity and shading that provide a three-dimensional impression based on non-spectral volumetric image data from a scan of the tubular structure. The method further includes generating a visual encoding for the three-dimensional endoscopic rendering that visually distinguishes a wall of the tubular structure from structure of interest on the wall based on spectral characteristics determined from spectral volumetric image data from the scan. The method further includes displaying three-dimensional endoscopic rendering with the visual encoding.

Those skilled in the art will recognize still other aspects of the present application upon reading and understanding the attached description.

BRIEF DESCRIPTION OF THE DRAWINGS

The invention may take form in various components and arrangements of components, and in various steps and arrangements of steps. The drawings are only for purposes of illustrating the embodiments and are not to be construed as limiting the invention.

DETAILED DESCRIPTION OF EMBODIMENTS

The following describes an approach for generating a 3-D VE rendering of a lumen based on both non-spectral and spectral volumetric imaging data. The spectral volumetric imaging data is used at least to visually encode inner walls of a tubular structure and structure/materials thereon based on spectral characteristics of the walls and structure/materials. The 3-D VE is a 2-D image that provides a 3-D impression similar to the view of a real endoscope. Examples of the tubular structures/VE procedures include the colon/VC, bronchi/virtual bronchoscopy (VB), etc. For 3-D VC, in one instance, structure such as flat and/or serrated polyps, which tend to be difficult to visually detect by shape due to their inconspicuousness with the colon, are visually encoded in the displayed 2-D image based on their spectral characteristics and differently than the colon wall, which may allow for visually distinguishing polyps from wall tissue, stool, etc. through spectral characteristics.

Figure 1:
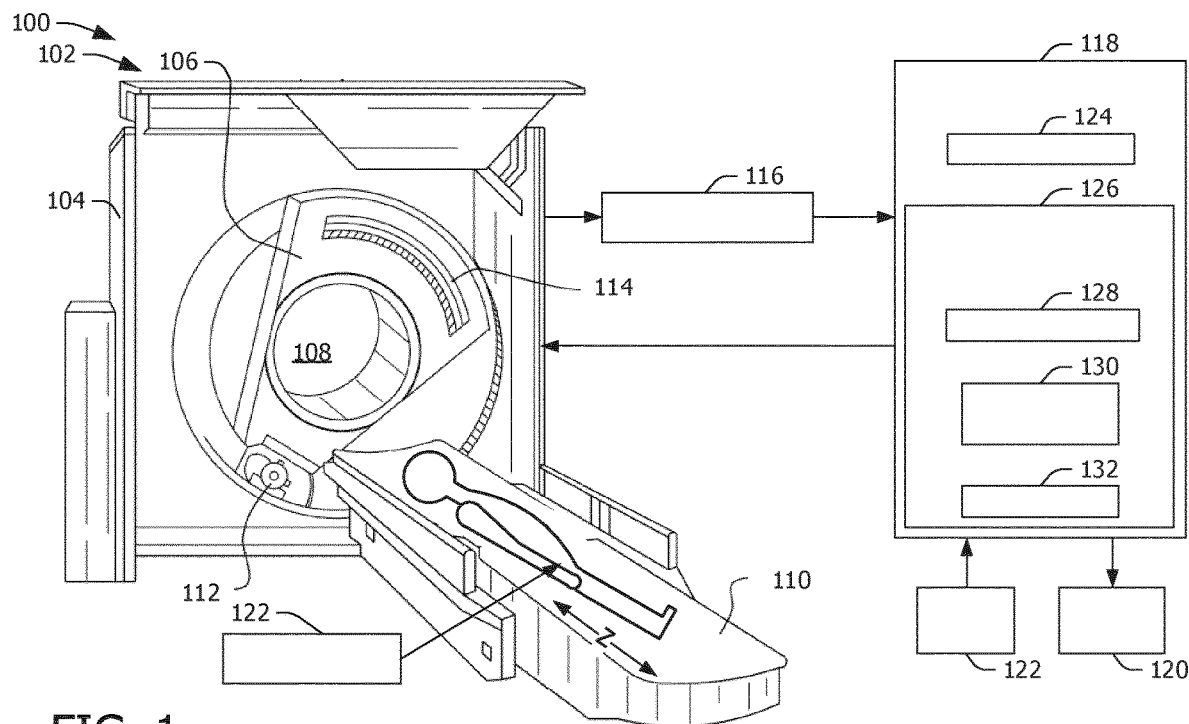
FIG. 1 diagrammatically illustrates a system including a 3-D VE module in accordance with an embodiment(s) herein.

FIG. 1 diagrammatically illustrates a system 100 in accordance with an embodiment(s) herein. The system 100 includes a computed tomography (CT) scanner 102. The CT scanner 102 is configured for non-spectral imaging and spectral (multi-energy) imaging such as dual-energy imaging. The CT scanner 102 includes a stationary gantry 104 and a rotating gantry 106, which is rotatably supported by the stationary gantry 104 and rotates around an examination region 108 (and a portion of an object or subject therein) about a longitudinal or z-axis. A subject support 110, such as a couch, supports a subject or object in the examination region 108. The subject support 110 is movable in coordination with performing an imaging procedure so as to guide the subject or object with respect to the examination region 108 for loading, scanning, and/or unloading the subject or object. For a VC scan, the subject ingests a radiocontrast agent such as an iodine, barium, etc. based radiocontrast agent before the scan.

A radiation source 112, such as an X-ray tube, is supported by and rotates with the rotating gantry 106 around the examination region 108. The radiation source 112 emits X-ray radiation that is collimated e.g., by a source collimator (not visible) to form a generally fan, wedge, cone or other shaped X-ray radiation beam that traverses the examination region 108. In one instance, the radiation source 112 is a single X-ray tube configured to emit broadband (polychromatic) radiation for a single selected peak emission voltage (kVp) of interest. In another instance, the radiation source 112 is configured to switch between at least two different emission voltages (e.g., 70 keV, 100 keV, 120 keV, 140 keV, etc.) during a scan. In yet another instance, the radiation source 112 includes two or more X-ray tubes angular offset on the rotating gantry 104 with each configured to emit radiation with a different mean energy spectrum. In still another instance, the CT scanner 102 includes a combination of two or more of the above. An example of kVp switching and/or multiple X-ray tubes is described in U.S. Pat. No. 8,442,184 B2, filed Jun. 1, 2009, and entitled "Spectral CT," which is incorporated herein by reference in its entirety.

A radiation sensitive detector array 114 subtends an angular arc opposite the radiation source 112 across the examination region 108. The detector array 114 includes one or more rows of detectors that are arranged with respect to each other along the z-axis direction and detects radiation traversing the examination region 108. In one instance, the detector array 114 includes an energy-resolving detector such as a multi-layer scintillator/photo-sensor detector. An example system is described in U.S. Pat. No. 7,968,853 B2, filed Apr. 10, 2006, and entitled "Double decker detector for spectral CT," which is incorporated herein by reference in its entirety. In another instance, the detector array 114 includes a photon counting (direct conversion) detector. An example system is described in U.S. Pat. No. 7,668,289 B2, filed Apr. 25, 2006, and entitled "Energy-resolved photon counting for CT," which is incorporated herein by reference in its entirety. In these instances, the radiation source 112 includes the broadband, kVp switching and/or multiple X-ray tube radiation sources. Where the detector array 114 includes a non-energy-resolving detector, the radiation source 112 includes kVp switching and/or multiple X-ray tube radiation sources. The radiation sensitive detector array 114 produces at least spectral projection data (line integrals) indicative of the examination region 108. In one configuration, the radiation sensitive detector array 114 also produces non-spectral projection data.

A reconstructor 116 processes the projection data from a same scan and generates spectral volumetric image data and non-spectral volumetric image data. The reconstructor 116 generates spectral volumetric image data by reconstructing the spectral projection data for the different energy bands. An example of spectral volumetric image data includes low energy volumetric image data and high energy volumetric image data for a dual energy scan. Other spectral volumetric image data can be derived through material decomposition in the projection domain followed by reconstruction or in the image domain. Examples include Compton scatter (Sc) and photo-electric effect (Pe) bases, an effective atomic number (Z-value), contrast agent (e.g., iodine, barium, etc.) concentration, and/or other basis. Where the CT scanner 102 produces non-spectral projection data, the reconstructor 116 generates non-spectral volumetric image data with the non-spectral projection data. Otherwise, the reconstructor 116 generates non-spectral volumetric image data by combining the spectral projection data to produce non-spectral projection data and reconstructing the non-spectral projection data and/or combining spectral volumetric image data to produce non-spectral volumetric image data. The reconstructor 116 can be implemented with a processor such as a central processing unit (CPU), a microprocessor, etc.

An operator console 118 includes a human readable output device 120 such as a display monitor, a filmer, etc. and an input device 122 such as a keyboard, mouse, etc. The console 118 further includes a processor 124 (e.g., a CPU, a microprocessor, etc.) and computer readable storage medium 126 (which excludes transitory medium) such as physical memory like a memory storage device, etc. In the illustrated embodiment, the computer readable storage medium 126 includes a 3-D virtual endoscopy (VE) module 128, a rendering module 130 and an artificial intelligence (AI) module 132, and the processor 124 is configured to execute computer readable instructions of the 3-D VE module 128, the rendering module 130 and/or the AI module 132, which causes functions described below to be performed.

In a variation, the 3-D VE module 128, the rendering module 130 and/or the AI module 132 are executed by a processor in a different computing system, such as a dedicated workstation located remotely from the CT scanner 102, "cloud" based resources, etc. The different computing system can receive volumetric image data from the CT scanner 102, another scanner, a data repository (e.g., a radiology information system (RIS), a picture archiving and communication system (PACS), a hospital information system (HIS), etc.), etc. The different computing system additionally or alternatively can receive projection data from the CT scanner 102, another scanner, a data repository, etc. In this instance, the different computing system may include a reconstructor configured similar to the reconstructor 116 in that it can process the projection data and generate the spectral and non-spectral volumetric image data.

The 3-D VE module 128 generates, based on both the non-spectral volumetric image data and the spectral volumetric image data, a 3-D VE rendering (i.e. 2-D image with a 3-D impression) of a lumen of a tubular structure from a viewpoint of a virtual camera of a virtual endoscope passing through the lumen. In one instance, the 3-D VE rendering is similar to the view which is provided by a physical endoscopic video camera inserted into the actual tubular structure and positioned at that location. In this instance, e.g., the 3-D VE rendering shows the inner wall of the tubular structure, including surfaces and structure/materials on the surfaces of the inner wall.

In one instance, the 3-D VE module 128 determines local opacity and gradient shading with the non-spectral volumetric image data. The 3-D VE module 128 can employ volume rendering, surface rendering and/or other approaches. With volume rendering, a virtual view ray is cast through the non-spectral volumetric image data and a region about the wall of the tubular structure is detected via a sharp gradient at the air/wall interface along a ray, where an opacity of the data points in the region begins low and increases sharply of the gradient. Shading is determined based on the angle between the viewing angle and local gradient and implemented through intensity. With surface rendering, a mesh (e.g., triangular or other) is fitted to the wall, e.g., at the strongest gradient, which is at the air/wall interface along a ray. An example approach for generating a 3-D VE rendering is described in U.S. Pat. No. 7,839,402 B2, filed Jun. 2, 2005, and entitled "Virtual endoscopy," which is incorporated herein by reference in its entirety.

The 3-D VE module 128 generates visual encodings based on the spectral characteristics of the spectral volumetric image data for pixels of the 3-D rendering representing surfaces of inner walls of the tubular structure and/or structure/materials thereon. As described in greater detail below, in one instance, the visual encodings include color hue encodings and correspond to a spectral angle, an effective atomic number, a contrast agent concentration, other spectral characteristic and/or a combination thereof. The visual encodings may convey visual cues to an observer about a presence and/or a type of a structure/material. These spectral characteristics cannot be determined only from the non-spectral volumetric image data and thus the visual encodings are not part of existing 3-D VE technology. As such, the approach described herein, which further utilizes spectral volumetric image data to visually encode a 3-D VE rendering based on spectral characteristics, represents an improvement over the existing 3-D VE technology. In addition, the visual encodings allow for efficient visual assessment.

Figure 2:
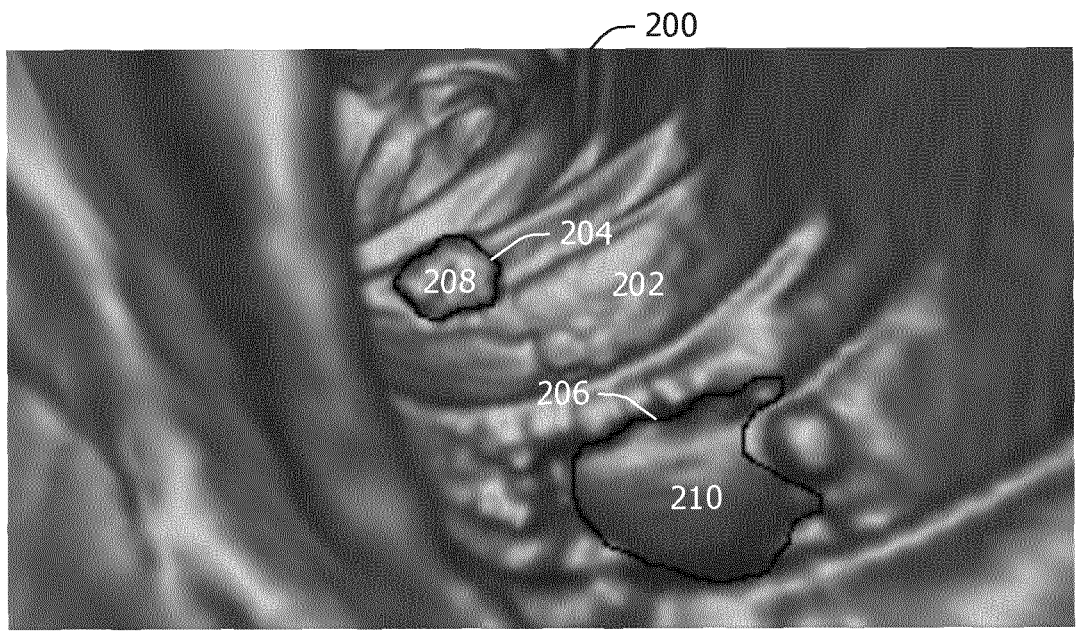
FIG. 2 shows an example 3-D VE rendering produced by the 3-D VE module of FIG. 1 in accordance with an embodiment(s) herein.

A rendering module 130 displays the 3-D VE rendering via a display monitor of the output device 120. FIG. 2 shows an example 3-D VE rendering 200 of an inside wall 202 of a colon with visual encodings 204 and 206 respectively for polyps 208 and 210. For explanatory purposes, the visual encodings 204 and 206 are shown as dark perimeter lines of the polyps 208 and 210. Other visual encodings may include color hue, brightness, cross hatching, annotation and/or other visually encoding. In one instance, the visual encodings are displayed based on a predetermined opacity level such as a default static opacity level, a user defined opacity level, an opacity level defined for a particular type of scan, etc. The predetermined opacity level can be fully or semi-opaque. In another instance, the opacity level is adjustable between full (or other level of) transparency and full (or other level of) opacity through one or more intermediate partially transparent/opaque levels. With this instance, the console 118 includes a control such as a physical control like a keyboard button or a soft control like a graphical user interface menu option, a graphical slider, dial, etc. In one example, the adjustable control allows for comprehensive and efficient visual assessment.

The rendering module 130 displays the 3-D VE rendering alone or in combination with one or more other images, such as one or more slice (axial, coronal, sagittal, oblique, etc.) images from the non-spectral and/or spectral volumetric image data, a rendering of just the tubular structure with material outside of the tubular structure rendered invisible, etc. In one instance, the same visual encoding (e.g., color hue) is concurrently displayed in the one or more of the other displayed images, and visualization thereof is controlled independently from or dependently with control of the visual encoding in the displayed 3-D VE rendering. Additionally or alternatively, the 3-D VE rendering is interactively linked (spatially coupled) to one or more of the other displayed images such that hovering the display screen pointer, such as a mouse pointer, over the displayed 3-D VE rendering results in the display of a location indicator in one or more of the other displayed images indicating the location of the pointer in the displayed 3-D VE rendering.

Figure 3:
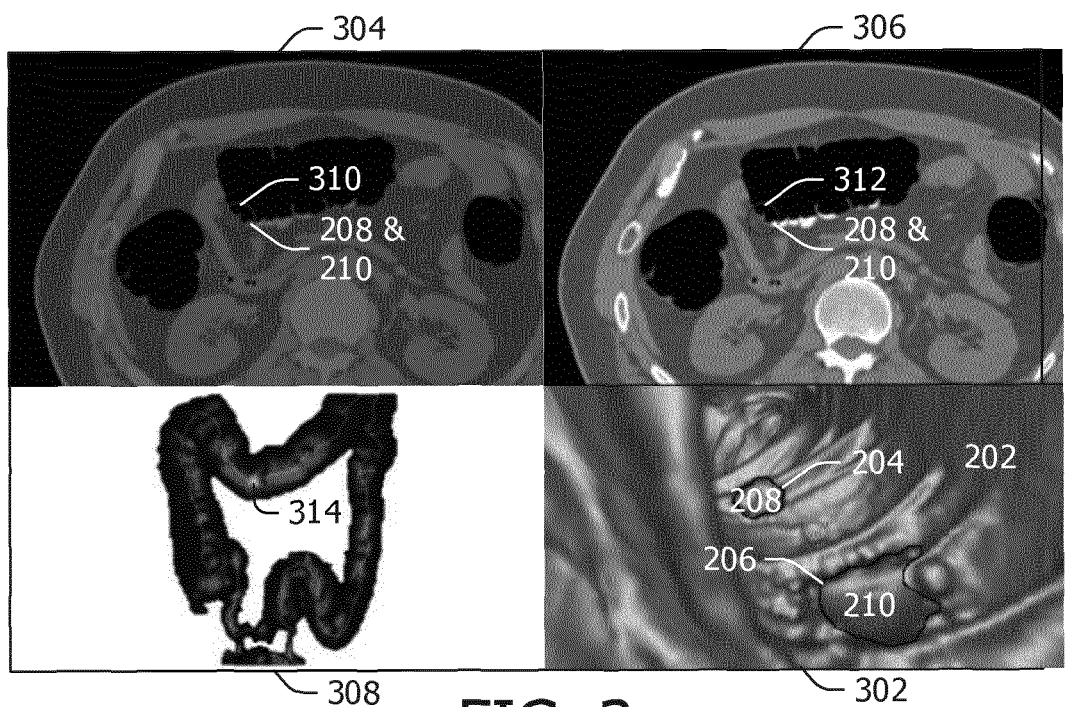
FIG. 3 shows a display with multiple windows displaying the 3-D VE rendering and other images.

FIG. 3 shows an example display with multiple windows 302, 304, 306 and 310. The window 302 shows the 3-D VE rendering 200 from FIG. 2. The windows 304 and 306 display a polar (angular) representation derived from photo-electric effect and Compton scatter spectral volumetric image data sets. The window 304 shows a first axial slice image representing magnitude. The window 306 shows a second axial slice image representing an angle. The windows 304 and 306 respectively include indicia 310 and 312 indicating a portion of the colon shown in the window 302 along with visual encoding corresponding to the polyps 208 and 210 of FIG. 2. For explanatory purposes, the polyps 208 and 210 are color encoded in windows 304 and 306 in a gray scale whereas the polyps 208 and 210 are outline encoded in window 302. However, it is to be understood that the same visual encoding can be used in both the window 302 and the windows 304 and 306. The window 306 shows an image just of the colon with indicia indicating a location in the colon corresponding to the 3-D rendering in the window 302.

Returning to FIG. 1, the AI module 132 processes at least the 3-D VE rendering and generates and displays via the output device 120 information that may assist a computing system and/or a clinician with distinguishing visual encodings of structure/material of interest from other structure/material that has similar shape, texture and/or spectral characteristics. For example, with CT VC, the information may facilitate distinguishing visual encodings of contrast enhanced flat and/or serrated polyps from similar visual encodings of contrast enhanced stool on the surface wall of the colon. In one instance, the AI module 132 is trained with 3-D VE renderings including a training set of 3-D VE renderings with the structure/material of interest and without the other structure/material (e.g., flat and/or serrated polyps and no stool) and a training set of 3-D VE renderings with the other structure/material and without the structure/material of interest (e.g., stool and no flat and/or serrated polyps). The information does not provide a diagnosis or treatment, but may assist a clinician in evaluating the 3-D VE rendering.

In one instance, the AI module 132 includes a deep learning algorithm, such as a feed-forward artificial neural network (e.g., a convolutional neural network) and/or other neural network to learn patterns of the spectral characteristics of the different materials and/or structure, etc. to distinguish the structure/material of interest from the other structure/material. Examples of such algorithms are discussed in Gouk, et al., "Fast Sliding Window Classification with Convolutional Neural Networks," IVNVZ '14 Proceedings of the 29th International Conference on Image and Vision Computing New Zealand, Pages 114-118, Nov. 19-21, 2014, "Fully convolutional networks for semantic segmentation," Proceedings of the IEEE Conference on Computer Vision and Pattern Recognition, 2015, and Ronneberger, et al., "U-Net: Convolution Networks for Biomedical Image Segmentation," Medical Image Computing and Computer-Assisted Intervention (MICCAI), Springer, LNCS, Vol. 9351: 234-241, 2015. In a variation, the AI module 132 is omitted.

For some scans, an auxiliary device is employed with the CT scanner 102. For example, for a VC scan, an insufflator 122 may be used to inflate the colon for the scan. In one instance, the insufflator 122 is used to insufflate a gas into the colon to inflate the colon so that the wall of the colon can be more easily inspected via the displayed 3-D VE rendering.

As briefly described above, the VE module 128 generates the visual encodings for the 3-D rendering based on spectral characteristics determined from the spectral volumetric image data. The following describes a non-limiting example in which the visual encodings include color hues. In one instance, this includes determining a color hue for a pixel based on a spectral angle. In another instance, this includes determining a color hue for the pixel based on an effective atomic number. In yet another instance, this includes determining the color hue for a pixel based on a contrast agent concentration. In another instance, this includes determining the color hue for a pixel based on one or more other spectral characteristics. In still another instance, this includes determining a color hue for a pixel based on a combination of two or more of the above.

Figure 4:
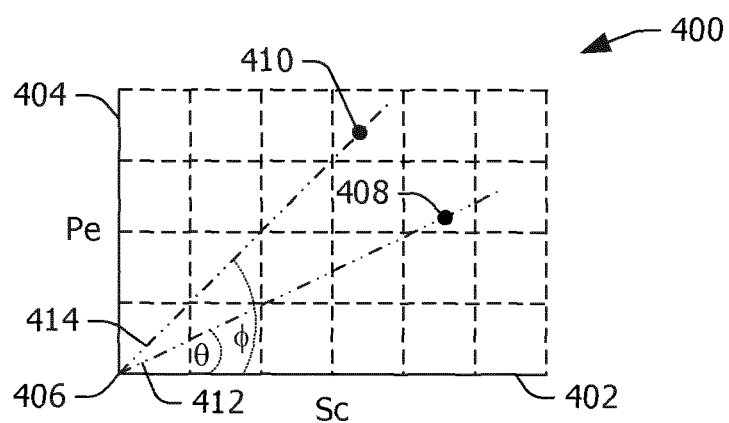
FIG. 4 shows an example scatter plot for a dual energy scan in accordance with an embodiment(s) herein.

An approach for determining the spectral angle includes determining a scatter plot from the spectral volumetric image data sets with a different spectral volumetric image data set on a different axis of the plot. FIG. 4 shows an example scatter plot 400 for a dual energy scan with Compton scatter (Sc) and photo-electric effect (Pe) bases. A first axis 402 represents voxel values (e.g., in Hounsfield Unit (HU)/CT number scale) of the Sc volumetric image data and a second axis 404 represents voxel values (i.e., in the same scale) of the Pe volumetric image data. In this example, the first axis 402 is assigned a first color hue and the second axis 404 is assigned a second different color hue. For instance, the first axis 402 is assigned red and the second axis 404 is assigned blue. In another instance, the first axis 402 is assigned red and the second axis 404 is assigned white. An origin 406 represents a HU value for a material of interest (e.g., air (−1000), water (0), contrast, soft tissue (100-300), etc.).

In FIG. 4, a first point 408 corresponds to the voxel values from the different spectral volumetric image data sets for a same first voxel location (x,y,z) in the spectral volumetric image data sets. A second point 410 corresponds to the voxel values from the different spectral volumetric image data sets for a same second voxel location in the spectral volumetric image data sets, where the first and second voxel locations are different. In this example, the voxels for the first and second points 408 and 410 represent different material with different spectral characteristics. The voxel for the point 410 has a greater Pe contribution and a lower Sc contribution relative to the voxel for the point 408. Other voxels representing the material corresponding to point 408 will be located in a vicinity about the point 408, and other voxels representing the material corresponding to point 410 will be located in a vicinity about the point 410.

In this example, a spectral angle $\theta$ is determined for the first point 408 as an angle between the first axis 402 and a line 412 extending from the first point 408 to the origin 406. In one instance, $\theta$ is determined by calculating an inverse of the tangent of a ratio of the Pe voxel value to the Sc voxel value (i.e. $\theta = \arctan(HU_{Pe}/HU_{Sc})$). A spectral angle $\phi$ is determined for the first point 410 as an angle between the first axis 402 and a line 414 extending from the second point 410 to the origin 406. In one instance, $\phi$ is determined by calculating an inverse of the tangent of a ratio of the Pe voxel value to the Sc voxel value (i.e. $\phi = \arctan(HU_{Pe}/HU_{Sc})$). In this example, the spectral angle $\theta$ for the pixel corresponding to the point 208 is smaller than the spectral angle $\phi$ for the pixel corresponding to the point 410. FIG. 4 only shows two points for explanatory purposes, but it is to be understood that the plot 400 can be used to determine a color hue for all or for a predetermined set of pixels in the 3-D VE rendering.

In one instance, the color hue for a pixel is determined from the spectral angle as a linear mixture between the first and second color hues of the first and second axis 402 and 404. The color hue for the pixel corresponding to the point 408 will be a linear mixture based on the angle $\theta$ and include a greater contribution of the first color relative to the second color since the illustrated angle $\theta$ is less than ninety degrees. The color hue for the pixel corresponding to the point 410 will be a linear mixture based on the angle $\phi$ and will include a greater contribution of the second color relative to the first color since the illustrated angle $\phi$ is greater than ninety degrees. In a variation, the spectral angle is translated non-linearly into a pseudo-color scale, such as a rainbow scale, a temperature scale, and/or other color hue scale.

In another embodiment, where a volume rendering algorithm is employed, the spectral angle is computed from a predetermined region in the spectral volumetric image data about the wall of the tubular structure in which the ray opacity saturates to unity and includes voxels before the wall and voxels after the wall. In one instance, the color hue is determined from a linear superposition from each location within the predetermined region weighted by the local opacity. In a variation, the color hue is instead determined as a maximum value within the predetermined region. In yet another variation, the color hue is instead determined as a mean or median value within the predetermined region. In yet another instance, the color hue is determined otherwise or based on a combination of the foregoing.

In another embodiment, the color hue is also determined based on a radial distance between a point on the plot and the spectral angle. For example, in this embodiment in FIG. 4 the color hue for the pixel corresponding to the point 408 is not only based on the angle $\theta$ but also on a distance between the point 408 and the origin 406. Likewise, the color hue for the pixel corresponding to the point 410 is not only based on the angle $\phi$ but also on a distance between the point 410 and the origin 406. As such, voxels with the same spectral angle will not necessarily have the same color hue depending on the distance between their points in the plot 400 and the origin 406. Alternatively, the color hue is not determined based on the radial distance between the point on the plot and the spectral angle.

In another embodiment, each coordinate in the grid in the scatter plot 400 of FIG. 4 is assigned a color hue. With this embodiment, a pixel is visually encoded with the color hue corresponding to the color hue assigned to the coordinate at which the pixel values of the spectral volumetric image data sets intersect. For instance, the pixel for the point 408 is visually encoded with the color hue assigned to the coordinate at point 408 in the grid, the pixel for the point 410 is visually encoded with the color hue assigned to the coordinate at point 410 in the grid, etc. This embodiment may not employ the spectral angle.

In another instance, the color hue is otherwise determined based on a combination of two or more of the above described approaches.

Figure 5:
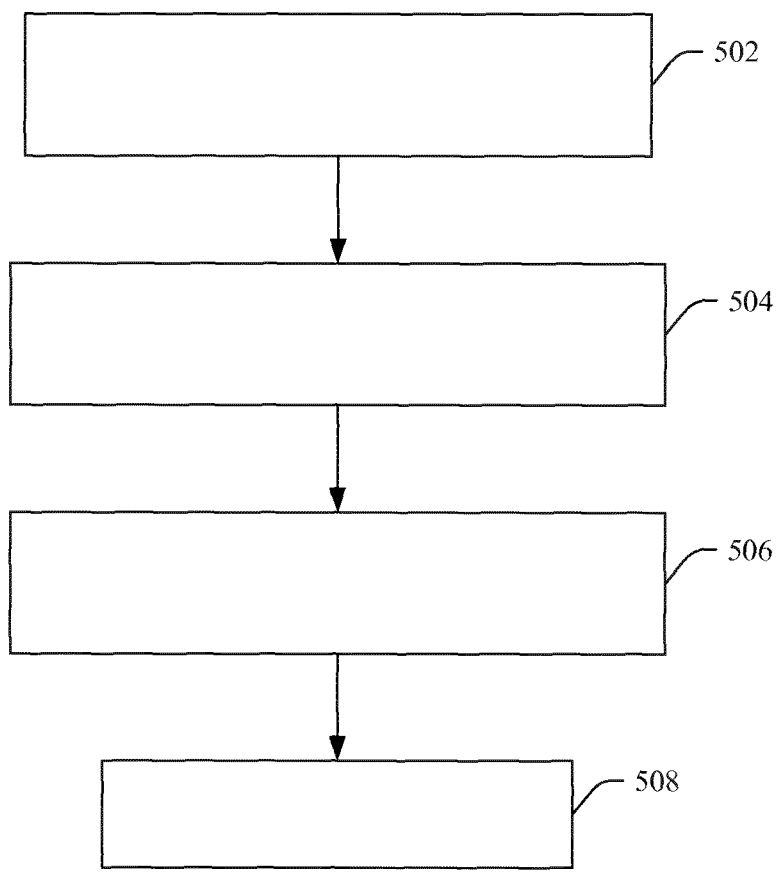
FIG. 5 illustrates an example method in accordance with an embodiment(s) herein.

FIG. 5 illustrates an example method in accordance with an embodiment(s) herein.

It is to be appreciated that the ordering of the acts in the method is not limiting. As such, other orderings are contemplated herein. In addition, one or more acts may be omitted, and/or one or more additional acts may be included.

At 502, non-spectral and spectral volumetric image data from a same scan of a tubular structure is obtained, as described herein and/or otherwise.

At 504, a 3-D VE rendering, including opacity and shading, is generated based on the non-spectral volumetric image data, as described herein and/or otherwise.

At 506, visual encodings for the pixels of the 3-D VE rendering are determined based on the spectral volumetric image data, as described herein and/or otherwise.

At 508, the 3-D VE rendering is displayed with the visual encoding, as described herein and/or otherwise.

The above may be implemented by way of computer readable instructions, encoded or embedded on computer readable storage medium, which, when executed by a computer processor(s), cause the processor(s) to carry out the described acts. Additionally, or alternatively, at least one of the computer readable instructions is carried out by a signal, carrier wave or other transitory medium, which is not computer readable storage medium.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

The word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A medical system for processing Computed Tomography (CT) image data, comprising:
a processor; and
a memory storage device configured with a three-dimensional virtual endoscopy module and a rendering module,
wherein the processor is configured to process non-spectral volumetric CT image data from a CT scan of a tubular structure with the three-dimensional virtual endoscopy module to generate a three-dimensional endoscopic rendering of a lumen of the tubular structure with an opacity and shading that provide a three-dimensional impression;
wherein the processor is further configured to process spectral volumetric CT image data from the same CT scan with the three-dimensional virtual endoscopy module to produce a visual encoding for the three-dimensional endoscopic rendering that visually distinguishes a wall of the tubular structure from structure of interest on the wall based on spectral characteristics; and
wherein the processor is further configured to execute the rendering module to display the three-dimensional endoscopic rendering with the visual encoding via a display monitor.

2. The system of claim 1, wherein the visual encoding includes a different color hue for the wall of the tubular structure and the structure of interest.

3. The system of claim 1, wherein the processor is configured to determine the visual encoding based on a spectral angle determined from the spectral volumetric CT image data.

4. The system of claim 3, wherein the spectral volumetric CT image data includes a first set of spectral volumetric CT image corresponding to a first energy and a second set of spectral volumetric CT image corresponding to a second different energy, and the processor is configured to determine the spectral angle based on an arctangent of a ratio of a first voxel value of a voxel coordinate from the first set of spectral volumetric CT image data to a second voxel value of the voxel coordinate from the second set of spectral volumetric CT image data.

5. The system of claim 3, wherein the processor is configured to determine a color hue for a pixel based on a linear mixture of a first color representing a smallest spectral angle and a second color representing a largest spectral angle.

6. The system of claim 3, wherein the processor is configured to determine a color hue for a pixel based on a translation of the spectral angle non-linearly into a color scale.

7. The system of claim 3, wherein the processor is configured to determine a color hue for a pixel based on a linear superposition of voxel values from different location within a predetermined region about the wall weighted by a local opacity of each location.

8. The system of claim 3, wherein the processor is configured to determine a color hue for a pixel based on a maximum voxel value, a mean voxel value or a medium voxel value within a predetermined voxel about the wall.

9. The system of claim 2, wherein the processor is configured to determine a color hue for a pixel from a predetermined color grid.

10. The system of claim 2, wherein the processor is further configured to determine an effective atomic number from the spectral volumetric CT image data and to determine a color hue for a pixel corresponding to a voxel coordinate based on the effective atomic number.

11. The system of claim 2, wherein the processor is further configured to determine an iodine concentration based on the spectral volumetric CT image data and to determine a color hue for a pixel corresponding to a voxel coordinate based on the iodine concentration.

12. The system of claim 1, wherein the processor is further configured to concurrently display the three-dimensional endoscopic rendering and a CT slice image interactively spatially coupled such that a region in the CT slice image corresponding to a pixel selected in the three-dimensional endoscopic rendering is visually identified.

13. The system of claim 1, wherein the processor is further configured to concurrently display the three-dimensional endoscopic rendering and a CT slice image interactively spatially coupled with the same visual encoding utilized in both the three-dimensional endoscopic rendering and the CT slice image.

14. The system of claim 1, wherein the memory storage device is further configured with an artificial intelligence module trained to distinguish between the wall of the tubular structure and structure of interest on the wall based on three-dimensional endoscopic rendering training sets, and the processor is further configured to employ the artificial intelligence module to present information distinguishing visual encodings of the wall from visual encodings of the structure of interest in the three-dimensional endoscopic rendering.

15. A computer-implemented method for processing Computed Tomography (CT) image data, comprising:
  processing non-spectral volumetric CT image data from a CT scan of a tubular structure to generate a three-dimensional endoscopic rendering of a lumen of a tubular structure with an opacity and shading that provide a three-dimensional impression;
  processing spectral volumetric CT image data from the same CT scan to produce a visual encoding for the three-dimensional endoscopic rendering that visually distinguishes a wall of the tubular structure from structure of interest on the wall based on spectral characteristics; and
  displaying three-dimensional endoscopic rendering with the visual encoding.

16. The method of claim 15, further comprising: displaying the visual encoding as a color hue.

17. The method of claim 16, further comprising:
  determining the spectral characteristic from a group consisting of a spectral angle, an effective atomic number or an iodine concentration.

18. A non-transitory computer-readable storage medium storing instructions that when executed by a computer cause the computer to perform a method for processing Computed Tomography (CT) image data, the method comprising:
  processing non-spectral volumetric CT image data from a CT scan of a tubular structure with a three-dimensional virtual endoscopy module to generate a three-dimensional endoscopic rendering of a lumen of a tubular structure with an opacity and shading that provide a three-dimensional impression;
  processing spectral volumetric CT image data from the same CT scan to produce a visual encoding for the three-dimensional endoscopic rendering that visually distinguishes a wall of the tubular structure from structure of interest on the wall based on spectral characteristics; and
  displaying three-dimensional endoscopic rendering with the visual encoding.

19. The non-transitory computer-readable storage medium of claim 18, the method comprising:
  displaying the visual encoding as a color hue.

20. The non-transitory computer-readable storage medium of claim 19, the method comprising:
  determining the spectral characteristic from a group consisting of a spectral angle, an effective atomic number or an iodine concentration.

* * * * *